(No Model.)
J. H. BACON.
ANGLE VALVE.
No. 371,540. Patented Oct. 18, 1887.
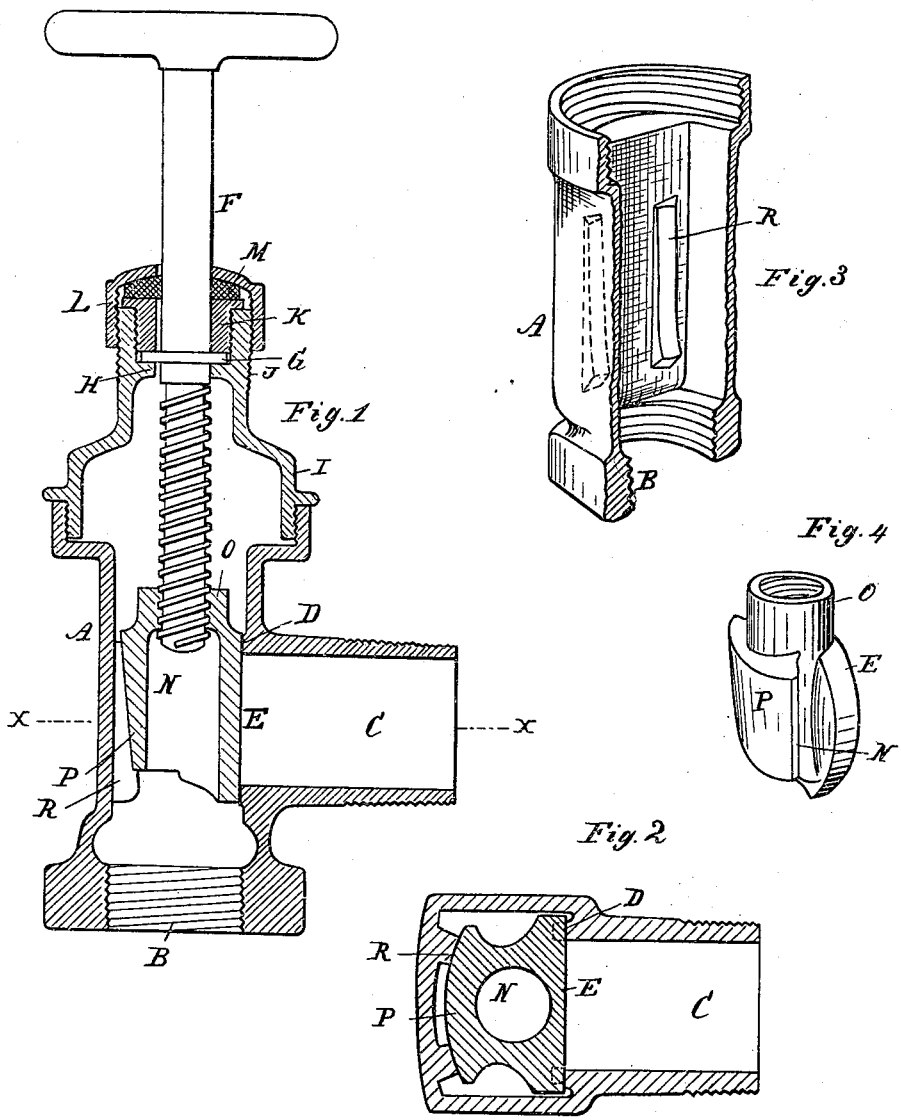
Inventor:
Joseph H. Bacon.
by his Att'y

UNITED STATES PATENT OFFICE.

JOSEPH HENRY BACON, OF DETROIT, MICHIGAN.

ANGLE-VALVE.

SPECIFICATION forming part of Letters Patent No. 371,540, dated October 18, 1887.

Application filed February 4, 1886. Serial No. 190,772. (No model.)

*To all whom it may concern:*

Be it known that I, JOSEPH HENRY BACON, of Detroit, in the county of Wayne and State of Michigan, have invented new and useful Improvements in Angle-Valves; and I do hereby declare that the following is a full, clear, and exact description thereof, reference being had to the accompanying drawings, which form a part of this specification.

This invention relates to certain new and useful improvements in valves; and it consists in the peculiar construction of the valve-face and the peculiar combinations and the construction, arrangement, and adaptation of parts, all as more fully hereinafter described and claimed.

Figure 1 is a central vertical section of my improved device. Fig. 2 is a cross-section on line $x\,x$, Fig. 1. Fig. 3 is a sectional perspective of the valve-case, showing guides. Fig. 4 is a perspective of the valve removed.

The object of this invention is to produce a valve especially adapted for use when the inlet and outlet are at right angles to each other.

In the accompanying drawings, which form a part of this specification, A represents a valve-case provided with the passages B C, at right angles to each other. In the drawings the latter passage at its inner end is formed with a seat, D, against which the valve E seats itself, as hereinafter described.

F is the valve stem, and is provided with a rigid collar, G, which, when the parts are in place, rests upon the inwardly-projecting flange H of the cap I, which screws upon the upper end of the valve-case. This cap I is provided with an upwardly-projecting annular flange, J, externally and internally threaded.

K is a screw-plug which slips over the valve-stem and engages with the internal or female thread of the flange J upon the top of the collar G, thus preventing any vertical displacement of the valve-stem.

L is a cap-nut which screws down upon the flange J, and which secures the packing M in place upon the top of the plug K. The bore through the plug K and flange H is slightly greater than the diameter of the valve-stem, for the purpose hereinafter stated.

The lower end of the valve-stem is threaded, as shown, for the purpose of vertically adjusting the valve E, which is constructed as follows:

N is a head, of which the nut O forms an integral part, and through which the valve-stem is tapped. The valve face or disk E also forms an integral part of the head N. The rear side of this head, or that opposite to the valve, is tapered upon vertical lines upon the arc of a circle, forming a wedge-shaped face, P, curved in cross-section.

R are guide-ribs, forming an integral part of the valve-case, and project inwardly therefrom into the valve-chamber. These guide-ribs are formed upon the same taper or inclination and their faces are curved upon the same lines as those upon which the wedge-face P is formed, and it will be observed that the ribs project far enough to prevent the wedge P from coming in contact with the wall of the case, thereby greatly reducing the friction.

It will be noticed that the bore through the valve-nut O is enlarged below the threaded portion, so that such nut may have a light lateral play upon the end of the valve-stem. The thread in this valve-nut I preferably form a trifle "off its center" toward the valve-face.

In practice, the parts being constructed and arranged substantially as set forth, we will suppose the valve to be opened and retracted into the upper part of the valve-case. In this position the water or steam has a free passage through both passages in the case, as can readily be seen.

If it is desired to close the valve, the valve-stem is rotated by means of the hand-wheel, causing the valve-nut to descend in the case, the inclined and curved back coming in contact with the guides until the valve has come coincident with its seat, the inflow or pressure of steam or water striking against the face of the valve keeping its opposite side firmly against the guides. By continuing to turn the valve-stem the valve is forced, through the medium of the guides, firmly against its seat in a direct line and with a very slight and imperceptible sliding movement upon the seat. By a reverse movement of the valve-stem the valve is loosened immediately and the stem is turned, when the force of the water or steam compels the valve to drop away from its seat, and from which position it is raised or opened by a further turning of the stem without in the least scratching or marring the face of the valve or its seat, and this result is produced by providing for the slight lateral play of the valve-nut upon the stem and the stem in its bearings, as herein described.

If desired, the valve-face may be recessed, as shown in dotted lines in Fig. 2, to enable a composite seat to be inserted that can readily be replaced when necessary.

It will be seen that the plunger when it nears the last stage of closing and is almost opposite its seat is still out of contact with said seat, but it has come in contact with the inclined guides upon the rear, and now the further closing of the valve produces a face movement of the plunger parallel to itself, but with a freedom of adjustability in both a horizontal and vertical plane, the former owing to the location of the guide-ribs and curvature at the back of the valve, and the latter owing to the formation of the enlarged chamber in the plunger below the nut and to the lateral play of the valve-stem. The center of movement for this adjustability is always in the center of the valve-disk, and therefore no injurious sliding of the valve disk upon the valve-seat is produced.

I am fully aware that the closing of valves has been effected heretofore by a face movement of the valve-disks derived by the action of wedges, but never with a solid plunger and perfect freedom of adjustability in a horizontal and vertical plane in the manner I claim. Further, the face movement of my valve-disk is effected by a superior wedge action derived from the peculiar location of the wedge in relation to the valve-seat, said wedge being directly opposite the valve-seat and as far as possible away from the axis of the stem, (which gives a leverage to the vertical adjustability,) with the whole body of the valve between it and the seat, whereby the wedge is in a position to transmit the whole thrust of the valve-stem in the direction of the face of the valve. Without this arrangement the face motion of the valve would be ineffectual to adjust the valve-disk to the valve-seat.

I am aware of the Patents Nos. 103,937, 129,017, and 257,275, and make no claim to anything shown therein as forming part of my invention.

I deem it important that the valve-nut have a slight lateral play on its stem and that the stem have a slight lateral play in its bearing, whereby scratching or marring of the face of the valve or its seat is prevented, as hereinbefore set forth.

What I claim as my invention is—

In an angle-valve, a valve face or disk wedge shaped perpendicularly and segmentally shaped in cross-section, and back P, formed in one piece, having an internally-threaded socket adapted to receive the threaded end of a proper stem, in combination with a concave seat and compression-ribs R, substantially as and for the purposes described.

JOSEPH HENRY BACON.

Witnesses:
H. S. SPRAGUE,
E. J. SCULLY.